United States Patent [19]

MacCready, Jr. et al.

[11] 4,206,892

[45] Jun. 10, 1980

[54] LIGHTWEIGHT AIRCRAFT

[75] Inventors: Paul B. MacCready, Jr., 1065 Armada Dr., Pasadena, Calif. 91103; Peter B. S. Lissaman, Pasadena; James D. Burke, Sierra Madre, both of Calif.

[73] Assignee: Paul B. MacCready, Jr., Pasadena, Calif.

[21] Appl. No.: 927,020

[22] Filed: Jul. 24, 1978

[51] Int. Cl.$^2$ .......................... B64C 9/06; B64C 3/06; B64C 31/04

[52] U.S. Cl. .................................. 244/45 A; 244/64; 244/90 R

[58] Field of Search ................... 244/90 R, 45 A, 64, 244/87, 82

[56] References Cited

U.S. PATENT DOCUMENTS

| 821,393 | 5/1906 | Wright et al. | 244/90 R |
|---|---|---|---|
| 1,187,291 | 6/1916 | Emmons | 244/45 A |
| 1,307,133 | 6/1919 | Lake | 244/90 R |
| 1,839,194 | 1/1932 | Blondin | 244/45 A |
| 2,681,776 | 6/1954 | Howard | 244/87 X |
| 4,010,920 | 3/1977 | Farner | 244/45 A X |

FOREIGN PATENT DOCUMENTS 15924 of 1909 United Kingdom ............... 244/45 A

OTHER PUBLICATIONS

"American Claims Kremer Man-Power Prize", *Flight International*, 09/03/77, pp. 676–677.

"Pedal-Powered Plane Flies-80 Feet", *Washington Post*, Apr. 22, 1976, p. A4.

*Primary Examiner*—Barry L. Kelmachter
*Attorney, Agent, or Firm*—William W. Haefliger

[57] ABSTRACT

An efficient aircraft utilizes a stabilizer spaced from a fixed wing, and supported for controlled rolling about an axis extending generally in a forward direction, to control aircraft yaw. The stabilizer extends generally horizontally in straight forward flight. Pitch of the stabilizer is also controlled.

12 Claims, 8 Drawing Figures

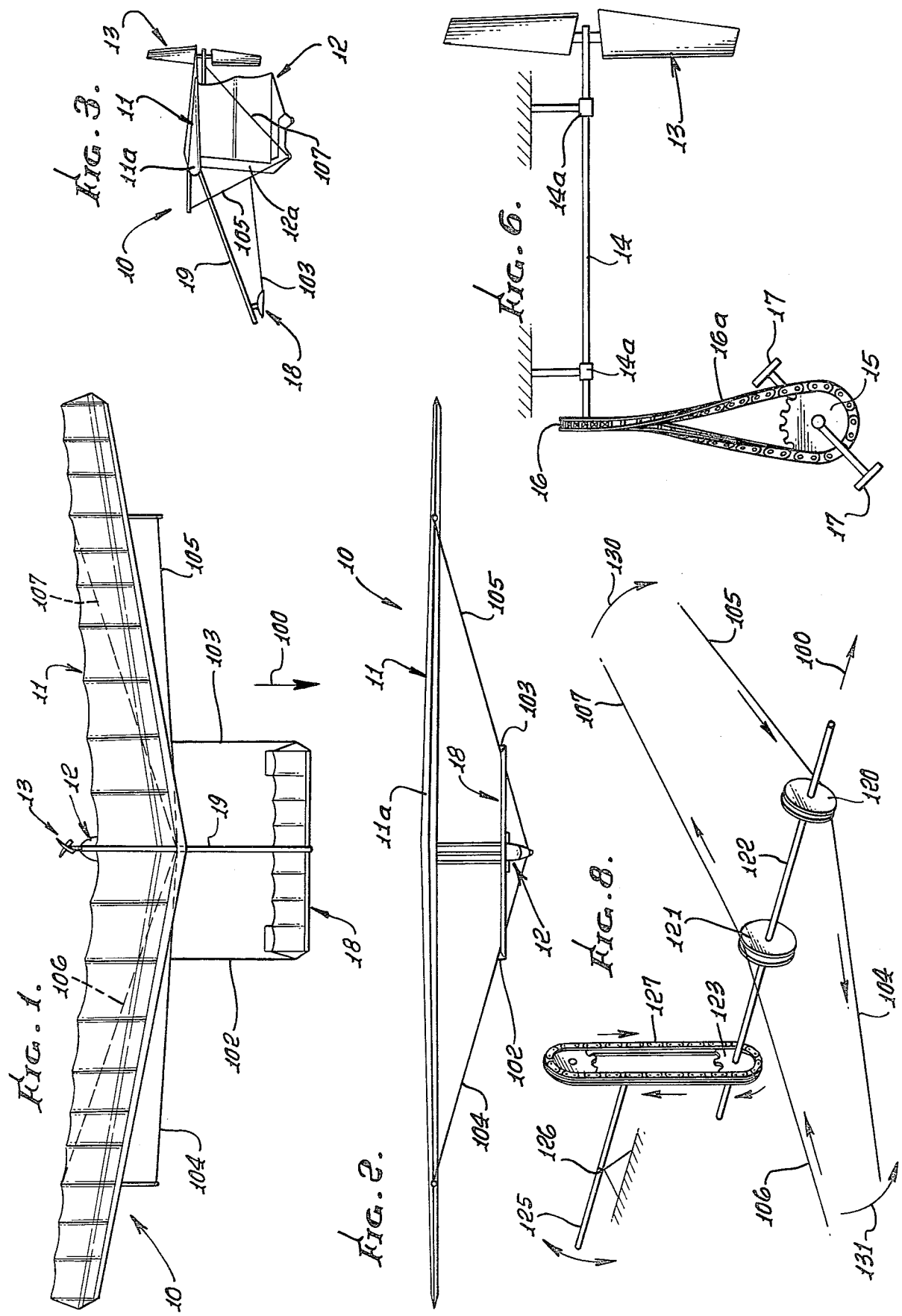

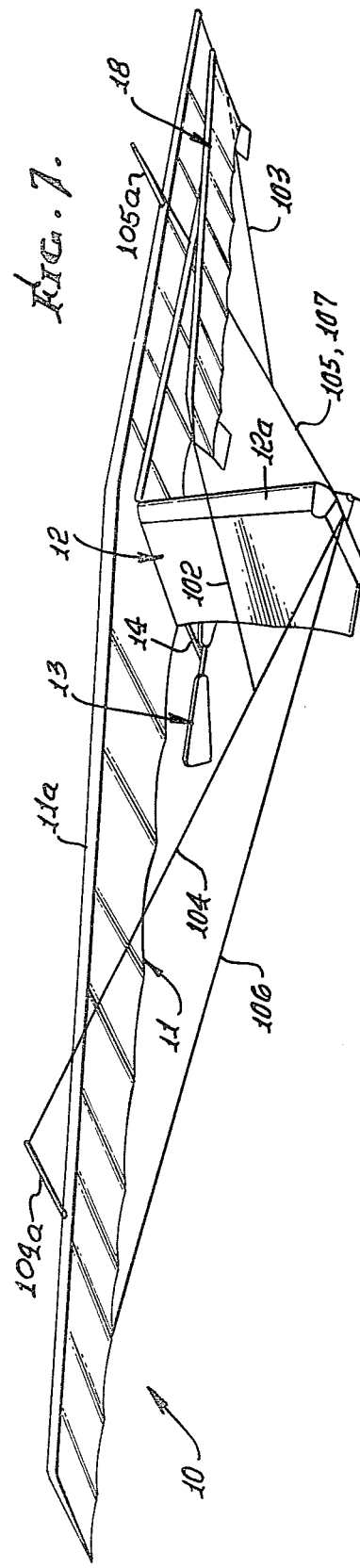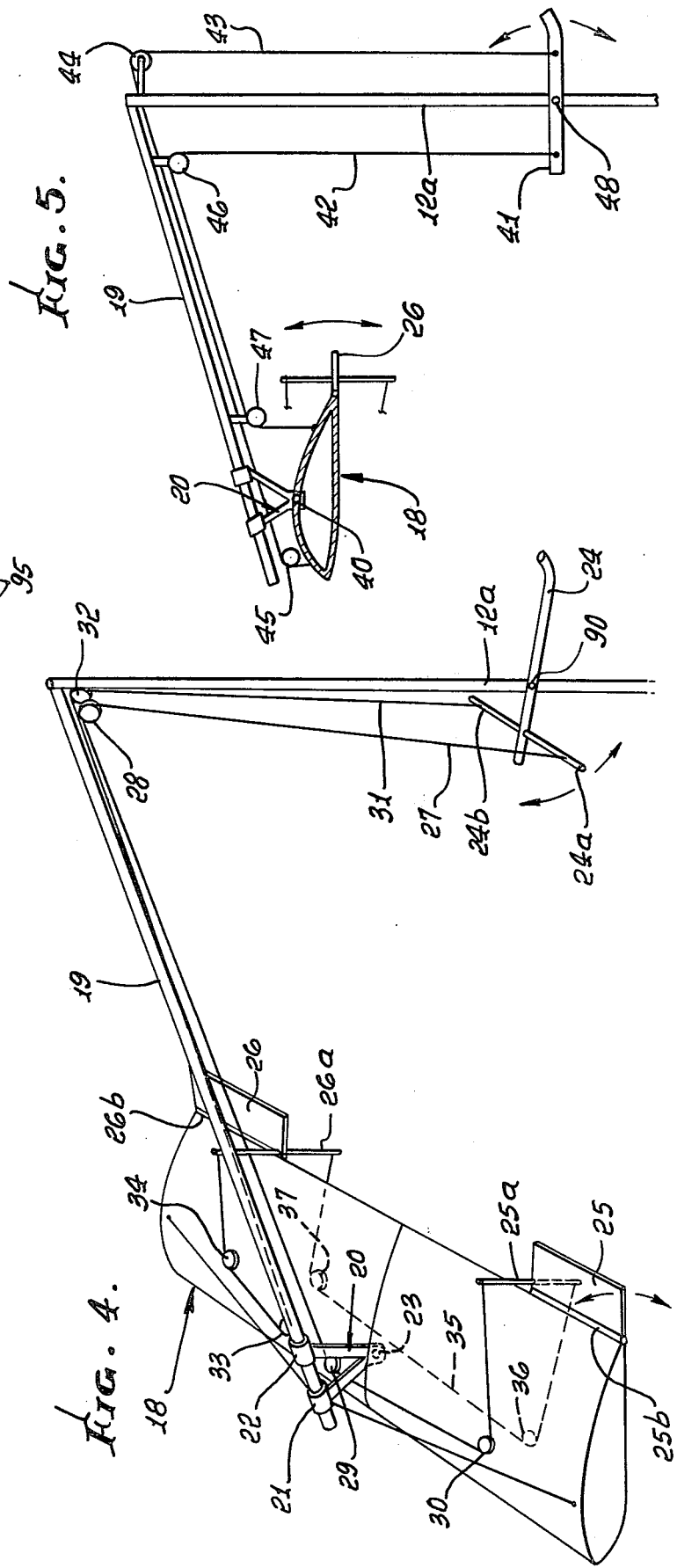

under numeral 4,206,892

LIGHTWEIGHT AIRCRAFT

BACKGROUND OF THE INVENTION

This invention relates generally to efficient aircraft, and more particularly concerns fixed wing aircraft capable of gliding or of being propelled by humans or low-powered engines.

The achievements of sustained human-powered flight has long been an important goal. For an airplane to operate effectively on very little power, it requires minimum structure in addition to the wing, since such added structure increases weight and drag. On the other hand, the aircraft must have stability and controllability. While many attempts have been made in the past to achieve these objectives, none have met with the success of an aircraft embodying the present invention. That aircraft was awarded the Kremer prize for a flight of specified length and number of turns as well as altitude changes and unassisted take off and landing.

SUMMARY OF THE INVENTION

It is a major object of the present invention to provide an aircraft meeting the above objectives and overcoming the deficiencies and failures of prior attempts to achieve significant human-powered flight. Basically, the invention is embodied in an aircraft having structure including a fixed wing and fuselage and also incorporating:

(a) a stabilizer spaced from the wing and which extends generally horizontally in straight forward flight, the stabilizer having a net vertical aerodynamic force on it, (b) support means permitting the stabilizer to roll about an axis extending generally in the forward flight direction, and (c) aircraft yaw control means connected to the stabilizer to control roll thereof.

As will be seen, the support means may typically include a support hingedly carrying the stabilizer to accommodate roll thereof; pitch control means is also associated with the stabilizer to control aircraft pitch attitude; manual controls at the fuselage are operable to control the roll and pitch attitudes of the stabilizer; and human-powered or other low powered mechanism may be provided to rotate a propeller, typically located rearwardly of the stabilizer. As a result, the following operational advantages are achieved:

(1) the invention eliminates need for a vertical rudder, since controlled roll of the horizontal stabilizer provides a wind pressure induced side force on it, which in turn transmits yawing force to the aircraft;

(2) the invention achieves lateral stability of the aircraft, without need for a vertical surface, (either fixed or movable) at the front or rear of the aircraft far from the center of gravity of the aircraft, by providing appreciable vertical surface area near the craft center of gravity. (The term "vertical surface area" means any surface which is normal straight light has an appreciable vertical extent, i.e. projected area exceeding 2% of the wing projected area. An example is the narrow fuselage to be described). Such "nearness" is sufficient to locate the center of the projected area at a distance from the craft center of gravity which is less than about 1/14 of the craft wing span, this being a critical factor;

(3) the invention achieves coordinated turns of the aircraft through provision for controlled rolling moment exerted by the wing either through twist (warp) or by ailerons, controlled roll of the stabilizer being employed for trim throughout the turn. In this regard, "twist" is in the sense that the inside wing (in a turn) is given a greater aerodynamic lift coefficient compared to the center of the wing; or by the outside wing being given lesser aerodynamic lift coefficient compared to the center of the wing. Wing ailerons, wing warping, or spoilers, or a combination of these, may be employed for this purpose.

These and other objects and advantages of the invention, as well as the details of an illustrative embodiment, will be more fully understood from the following description and drawings, in which:

DRAWING DESCRIPTION

FIG. 1 is a top plan view of an aircraft embodying the invention;

FIG. 2 is a frontal view of the FIG. 1 aircraft;

FIG. 3 is a side elevation of the FIG. 1 craft;

FIG. 4 is a perspective view of a stabilizer and roll controls employed in the FIG. 1 aircraft;

FIG. 5 is a side elevational view of the FIG. 4 stabilizer, and also showing pitch controls;

FIG. 6 illustrates mechanism to rotate a propeller;

FIG. 7 is a perspective showing of the aircraft of FIG. 1; and

FIG. 8 is a perspective showing wing twisting apparatus.

DETAILED DESCRIPTION

In the drawings, the aircraft 10 includes a wing 11, and a narrow fuselage 12 depending from the mid-portion of the wing. A main wing spar or frame member appears at 11a and is connected to fuselage vertical spar or frame member 12a. The direction of flight is indicated by arrow 100 in FIG. 1.

A propeller 13 is carried on a rearwardly extending shaft 14 which is rotatable to rotate the propeller at a location immidiately rearwardly of the fuselage. See FIGS. 6 and 7. Torque is transmitted to the shaft via a lower sprocket 15, upper sprocket 16, and a drive chain 16a interconnecting these two sprockets. Since the axes of the two sprockets are skewed by 90°, the chain twists through that angle, as shown. Pedals 17 on cranks are attached to the lower sprocket to rotate same. The two sprockets are suitably carried by the frame structure of the aircraft. Supports for shaft 14 appear at 14a in FIG. 6.

In accordance with the invention, a generally horizontally laterally extending stabilizer 18 is spaced forwardly of the wing in the flight direction, and support means carries the stabilizer to roll about an axis extending in the forward flight direction. (In this regard, the stabilizer may alternately be located rearwardly of the wing, and the propeller forwardly of the wing). The support means typically includes an elongated boom 19 whose axis may be generally the axis of roll, the stabilizer suspended at the forward end of the boom, and the rearward end of the latter being connected to the frame structure (as for example spar 12a), at the intersection of the wing and fuselage. A first hinge connection between the boom and stabilizer accommodates roll of the stabilizer, and in the example shown in FIG. 4, that connection includes a V-shaped bracket 20 the lower apex portion of which is connected at 23 to the stabilizer frame mid-way between its opposite ends. Sleeves 21 and 22 on the upper arm extents of the bracket receive the boom and define a hinge to accommodate roll. Such roll is independent of and relative to the boom in view of the hinge connection which includes sleeves 21 and 22, as shown. Wires 102 and 103 are connected to opposite ends of the stabilizer and to wing twist wires 104 and 105, to be described. Thus, the stabilizer is maintained transversely oriented, as shown in FIG. 1, as it rolls.

Yaw control means is connection to the stabilizer to control roll thereof, such means typically including a manual control lever 24 at the fuselage, and actuator structure such as a cable and pulley system connected between control 24 and stabilizer ailerons 25 and 26, as seen in FIG. 4. The cable and pulley system may include cable 27 connected between manual lever arm 24a and upper extent of aileron control lever 25a, via pulleys 28–30, as shown; and cable 31 connected between manual lever arm 24b and upper extent of aileron control lever 26a, via pulleys 32–34. Also, the lower extents of levers 25a and 26a are interconnected by cable 35 and pulleys 36 and 37. Pulleys 36 and 37 are carried by the stabilizer. Levers 25a and 26a are integral with the respective ailerons 25 and 26 (which are hinged to the stabilizer at 25b and 26b) so that when manual arm 24a is rotated down and arm 24b rotated up, aileron 25 moves up and aileron 26 moves down, to effect rolling of the stabilizer in a counterclockwise direction. Roll in a clockwise direction is produced by opposite rotation of arms 24a and 24b. Control 24 is pivotally connected at 90 to spar 12a.

Pitch control means is also connection to the stabilizer to control pitch angularity thereof. In the example shown in FIG. 5, a second hinge is connected between the boom and stabilizer to accommodate changes in pitch angularity of the stabilizer. Thus, a hinge pin 40 may be connected between the lower end of the V-bracket and the frame of the stabilizer. Further, a manual control lever 41 is located at the fuselage, and cables 42 and 43, extend from that lever to the stabilizer, as shown. Note also pulleys 44–47. The lever is hinged at 48 to vertical frame member 12a. As lever 41 is rotated clockwise, the stabilizer increases its pitch angularity, and vice versa.

It is found in practice that the following relationships are critically important:

(a) the stabilizer center of area should be spaced forwardly (or rearwardly) of the aircraft center of gravity at a distance greater than ½ of the span of wing 11;

(b) the stabilizer should be sized to produce a net up or down force averaging more than 1% of the aircraft gross weight;

(c) the stabilizer should be capable of controlled roll about the longitudinal axis of roll;

(d) the vertically projected area of mid-located structure, such as the fuselage, should exceed 2% of the wing vertically projected area, with the center of such area located at a distance from the craft center of gravity which is less than about 1/14 of the aircraft wing span.

Means is also provided to twist the wing extents at the left and right sides of the fuselage, to adjustably control the pitch thereof for turning of the aircraft. Such means typically includes cables or wires 104 and 105 extending from the fuselage to the forwardly projecting spars 104a and 105a on the wing outboard sections. Also wires 106 and 107 extend from the fuselage to the rearward portions of the wing outboard sections. FIG. 8 shows wires 104 and 105 wrapped about drum 120, wires 106 and 107 wrapped about drum 121. Those drums are on a common shaft 122 to which sprocket 123 is connected. A vertical chain 127 entrains sprocket 123 and upper sprocket 124, and a manual control lever 125 is pivoted at 126 and connected to the chain. When the lever 126 is pivoted upwardly, the chain rotates the drums 120 and 121 to pull out cables 104 and 107, and pull in cables 105 and 106. This twists the wing as indicated by arrows 130 and 131, and causes the wing end associated with arrow 130 to move up, and the opposite wing end to move down. The cables may be connected to wing ailerons, to accomplish wing movement as described, as an alternate configuration.

Landing wheels 95 are carried at the bottom of the fuselage.

We claim:

1. In an aircraft having structure including a fixed wing and a fuselage, the improvement comprising:
    (a) a stabilizer spaced from the wing and which extends generally horizontally in straight forward flight;
    (b) support means permitting the stabilizer to roll about an axis extending generally in the forward direction;
    (c) and aircraft yaw control means connected to the stabilizer to control roll thereof,
    (d) said support means including a boom connected to said structure and projecting generally in said forward direction, and a first hinge connection between said boom and said stabilizer suspending the stabilizer to roll independently of and relative to the boom,
    (e) said yaw control means including ailerons on the stabilizer and cables extending lengthwise of the boom to be turned near the hinge connection and proximate the stabilizer to control said ailerons as the stabilizer rolls relative to the boom.

2. The improvement of claim 1 including pitch control means connected to the stabilizer to control pitch angularity thereof.

3. The improvement of claim 2 including a second hinge connection between the first hinge connection and said stabilizer to accommodate changes in pitch angularity of the stabilizer.

4. The improvement of claim 1 wherein said yaw control means includes a manual control located at the fuselage, and an actuating system operatively connected between the manual control and said ailerons via said cables.

5. The improvements of claim 4 wherein said pitch control means includes a manual control located at the fuselage, and an actuating system operatively connected between the manual control and said stabilizer, said structure including an upright element to which said boom is affixed and which also carries said manual controls.

6. The improvement of claim 3 wherein said yaw control means includes a first manual control located at the fuselage, and a first actuator system operatively connected between the first manual control and said ailerons via said cables, and said pitch control means includes a second manual control located at the fuselage, and a second actuator system operatively connected between the second manual control and said stabilizer, said second system also including cables extending along the boom.

7. The improvement of claim 1 wherein the fuselage has horizontally projected area exceeding 2% of the wing vertically projected area, the center of the fuselage horizontally projected area located at a distance from the aircraft center of gravity which is less than about 1/14 of the aircraft wing span.

8. The improvement of claim 1 including means for developing aerodynamic roll moments exerted via the wing to facilitate turning of the aircraft in flight.

9. The improvement of claim 1 wherein the stabilizer is located frontwardly of the fuselage, and including a propeller carried by the aircraft generally rearwardly of the wing.

10. The improvement of claim 9 wherein the fuselage projects below the level of the wing, and is substantially entirely located within vertically projected area defined by the wing, and including human-powered mechanism extending from a pilot located in the fuselage to the propeller to rotate said propeller.

11. The improvement of claim 10 wherein said fuselage is relatively narrow in width, and projects vertically relative to the wing to provide substantial vertical side surface extent.

12. The improvement of claim 1 including cables operatively interconnected between the wing and end extents of the stabilizer.

* * * * *